United States Patent [19]

Oishi et al.

[11] Patent Number: 4,760,045

[45] Date of Patent: Jul. 26, 1988

[54] CATALYST FOR HYDROTREATMENT OF HEAVY OILS AND METHOD FOR ITS PREPARATION

[75] Inventors: Yasuyuki Oishi, Yokohama; Ken Kawakatsu, Kawasaki; Akira Inoue, Yokohama, all of Japan

[73] Assignee: Nippon Oil Co., Ltd., Japan

[21] Appl. No.: 870,224

[22] Filed: Jun. 3, 1986

[30] Foreign Application Priority Data

Jun. 5, 1985 [JP] Japan ................................. 60-121741
Feb. 25, 1986 [JP] Japan ................................. 60-38351

[51] Int. Cl.$^4$ ..................... B01J 23/22; B01J 23/28; B01J 23/30; B01J 23/74
[52] U.S. Cl. .................................... 502/321; 502/305; 502/313; 502/314; 502/325; 502/337; 502/353
[58] Field of Search ............... 502/305, 314, 313, 325, 502/353, 321, 337

[56] References Cited

U.S. PATENT DOCUMENTS 2,915,478 12/1959 Erickson ........................... 502/314
4,225,421 9/1980 Hensley et al. ............... 208/216 PP Primary Examiner—W. J. Shine
Attorney, Agent, or Firm—Ostrolenk, Faber, Gerb & Soffen

[57] ABSTRACT

The present invention provides a catalyst for hydrotreatment of heavy oils in which at least one active metal component for hydrogenation selected from the Groups Vb, VIb and VIII of the periodic table is supported in a porous refractory carrier, the catalyst being characterized in that a distribution of the metal concentrative in each catalyst satisfies the relation of $Cr_1 < Cr_2$ in the case of $R_1 > R_2$ in the sectional surface of said catalyst, and a method for preparing the catalyst.

15 Claims, 6 Drawing Sheets

CATALYST FOR HYDROTREATMENT OF HEAVY OILS AND METHOD FOR ITS PREPARATION

BACKGROUND OF THE INVENTION (1) Field of the Invention

The present invention relates to a catalyst for the hydrotreatment of heavy oils and a method for the preparation of the catalyst. More specifically, it relates to a hydrotreating catalyst for removing sulfur, nitrogen and metals such as nickel and vanadium contained in the heavy oils, and to a method for the preparation of the catalyst.

(2) Description of the Prior Art

As a worldwide petroleum situation in recent years, there is a tendency of manufacturing a larger amount of lighter oils, and in consequence, the treatment of heavier oil fractions is present as a problem. Particularly in residual oil from which the useful lighter oil fractions have been distilled out, sulfur, nitrogen and metals are concentrated. In other words, the concentration of these undesirable components is higher in the residual oil. There are a few processes to treat heavy oils to get the lighter fractions, for example, fluid catalytic cracking and hydrocracking. In the practice of such a process, sulfur, nitrogen and metals contained in the heavier oils cause air pollution, deteriorate the quality of products, or are a catalyst poison.

For this reason, a process for removing sulfur, nitrogen and metal by hydrotreating the heavier oils is getting more important. This hydrotreatment is a process in which the material oil is catalytically treated under a hydrogen pressure in order to remove the sulfur and the nitrogen therefrom by converting them into hydrogen sulfide and ammonia, or to remove the metal content therefrom by depositing it on the catalyst. Heretofore, an indirect desulfurization has been particularly utilized to mainly treat vacuum gas oils, and thus the metal content in the material oil has been small. However, along with the worldwide increase in the manufacture of the lighter oils from crude oil in recent years, metals such as nickel, vanadium and the like have increased in the residual oil, and in consequence, the residual oil has often been treated by a direct desulfurization.

A problem of such a process is that pores in the catalyst are plugged wtih the metal in the oils and coke, so that the activity of the catalyst will be poor and the operation of the apparatus will be impeded. Accordingly, in order to keep the stable operation of the apparatus, it is necessary to develop a catalyst having a long life which can effectively remove the metals contained in the material heavier oils and which can maintain its activity for a long period.

Many of the catalysts for the hydrotreatment of the heavy oils are in the form of particles or extrudates each having a diameter of several millimeters to 1 cm. In general, the catalysts are made by a solution impregnation method, which comprises dissolving a catalytically active component in a solvent, immersing a carrier into the resultant solution, removing the carrier therefrom after a predetermined period, drying and then calcining.

When the active metal is supported in the carrier in accordance with the above method just described, the concentration of the active metal is uniform in the carrier or is high in the vicinity of the outside surface of the carrier.

When the hydrotreatment of the heavy oils is carried out by the use of the thus prepared catalyst, metals in the heavy oils and deposited in the vicinity of the outside surface of the catalyst, so that pores in the catalyst are plugged therewith, with the result that active sites in the catalyst are not utilized sufficiently.

As means to eliminate this disadvantage, there is a method (Japanese Patent Provisional Publication No. 132945/1984) in which the concentration of the active metal is lowered to inhibit the deposition of molecules containing the metals in the heavy oils in the vicinity of the outside surface of the carrier and to thereby allow the molecules to diffuse into the interior of the catalyst, whereby the active point in the catalyst is used effectively.

Further, another method (U.S. Pat. No. 4,225,421) is also present in which the diameter of each pore is enlarged or a bimodal carrier is employed for the purpose of allowing the molecules containing the metals to diffuse to the interior of the catalyst.

However, in the former method, the overall activity of the catalyst is low, and in the latter method, the surface area of the catalyst is small and each pore volume is large, which facts require a great deal of the active metal to be supported.

SUMMARY OF THE INVENTION

The inventors of the present application have conducted research with the intention of solving the above mentioned problems, and as a result thereof, they have found that the metal present in heavy oils can be uniformly deposited in a catalyst by regulating the concentrative distribution of active metal component for hydrogenation in a carrier, i.e., by establishing the regulation so that the concentration of the active metal may be low in the vicinity of the outside surface of the carrier and may become higher toward the center of the carrier, whereby the life of the catalyst is prolonged, maintaining its activity, and the present invention has now been completed on the basis of such knowledge.

That is, the present invention provides a catalyst for hydrotreatment of heavy oils, in which at least one active metal component for hydrogenation selected from the Groups Vb, VIb and VIII of the periodic table is supported in a porous refractory carrier, the catalyst being characterized in that distribution of the metal concentration in each catalyst satisfies the relation of $Cr_1 < Cr_2$ in the case of $R_1 > R_2$ in the sectional surface of said catalyst, wherein $R_1$ and $R_2$ represent ratios of distances $r_1$ and $r_2$ from the center of the sectional surface of catalyst to optional points therein, respectively, to a distance l from the aforesaid center to the outside surface of the catalyst, and $Cr_1$ and $Cr_2$ represent concentrations of the metal component at the points.

Further, the present invention provides a method for preparing a catalyst for hydrogenation of heavy oils by supporting an active metal in a porous refractory carrier, the method being characterized by comprising the steps of immersing the carrier into the following solution A, removing it therefrom, and further immersing it into the following solution B, or after the immersion in the solution B, removing it therefrom, and immersing it into the solution A again, so as to control the concentrative distribution of the active metal in the carrier:

solution A: an aqueous solution containing at least one active metal selected from the Groups Vb, VIb and VIII of the periodic table; or an aqueous solution containing the aforesaid active metal and at least one selected from the group consisting of anions of Group VII of the periodic table, an ammonium ion, nitrate ion, sulfate ion, hydroxyl ion, phosphate ion, borate ion and organic acids; and solution B: water or an aqueous solution containing at least one selected from the group consisting of anions of the Group VII of the periodic table, an ammonium ion, nitrate ion, sulfate ion, hydroxyl ion, phosphate ion, borate ion and organic acids.

Figure 2:
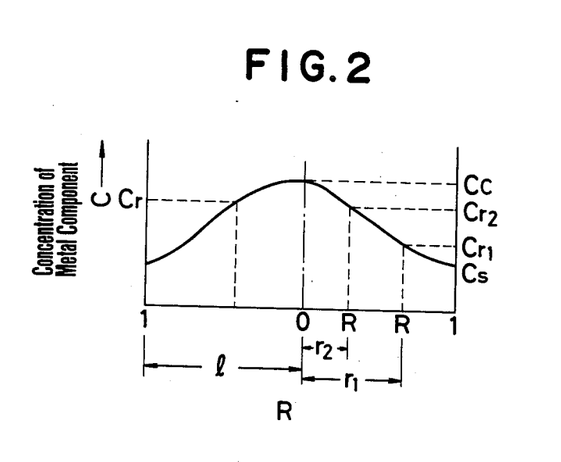
FIG. 2 is a schematic explanatory view of a linear analysis by EPMA regarding the catalyst.

The catalyst of the present invention is characterized by the distribution of the hydrogenating active metal component concentration in the porous refractory carrier, i.e., as shown in FIG. 2, by the distribution of the metal component concentration which gets higher moving from the outside surface toward the center of the catalyst. In other words, in the case that in the section of the catalyst, the distance from the center to the outside surface of the catalyst is l; the distances from the aforesaid center to the optional points therein are $r_1$ and $r_2$, respectively; the ratios of $r_1$ and $r_2$ to l are $R_1$ ($=r_1/l$) and $R_2$ ($=r_2/l$), respectively; and the concentrations of the metal component at the points which are the distances $r_1$ and $r_2$ away from the center are $CR_1$ and $CR_2$, respectively; it is essential that the distribution of the metal component concentration in the catalyst satisfies the relation of $Cr_1 < Cr_2$, if $R_1 > R_2$.

According to the above mentioned constitution, the activity of the catalyst in the vicinity of the outside surface of the catalyst can be inhibited, so that the adhesion and decomposition of metals and coke can be reduced in the vicinity of the outside surface of the catalyst, with the result that the life of the catalyst can be prolonged.

In the present invention, as a method for measuring the distribution of the active component concentration in the catalyst, there is an X-ray microanalysis method (EPMA). In this method, the catalyst, when having the form of an extrudate, is cut at right angles to its outer peripheral surface, or when having the form of a sphere, it is cut passing through its center. Then, the exposed section of the catalyst is scanned by means of EPMA, thereby obtaining a drawing in which the desired concentrative distribution is shown.

BRIEF DESCRIPTION OF THE DRAWINGS

FIGS. 1 (a) and 1 (b) are schematic views illustrating sectional states of a extrudate catalyst and a spherical catalyst, respectively;

c . . . concentration of metal components l . . . distance from the center to the outside surface of the catalyst grain r . . . distance from the center of the catalyst grain to an optional point therein C . . . concentration of metal components at the point which is the distance r away from the center of the catalyst and R . . . ratio ($=r/l$) of the distance r to the distance l;

DETAILED DESCRIPTION OF THE INVENTION

Figure 1A:
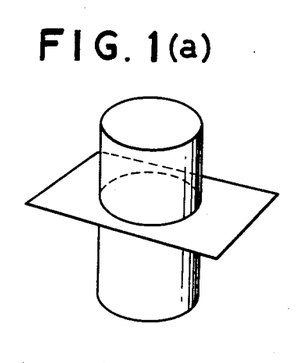
Figure 1B:
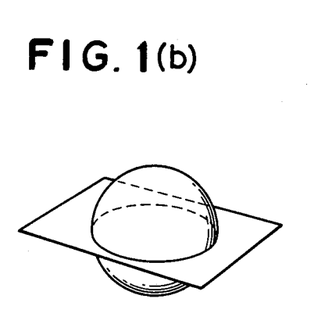

In the first place, a catalyst, in the case of having a columnal form, is cut at right angles to the outer peripheral surface thereof, or in the case of having a spherical form, it is cut passing through the center thereof, as shown in FIGS. 1 (a) and 1 (b), respectively. The thus cut and exposed surface of the catalyst are called a sectional surface hereinafter.

Next, a concentration of metal components can be measured with a spot having a diameter of 10 microns on the sectional surface by means of EPMA. Further, this spot is scanned in a certain direction on the sectional surface in order to obtain a drawing in which the concentration of the metal components is shown. In the present invention, it is necessary to measure the concentration of the metal components in an axial direction passing through the center of the sectional surface, and an example is shown in FIG. 2.

By the use of FIG. 2, the concentration of the metal components at an optional point on the sectional surface of the catalyst can be sought.

In FIG. 2, the ordinate represents a concentration C of the metal components, and the abscissa represents a ratio R ($=r/l$) of a distance r from the center of the catalyst to an optional point therein to a distance l from the center to the outside surface of the catalyst. Therefore, R=0 means the center of the catalyst, and R=1 means the surface of the catalyst.

The present invention is characterized by the distribution of the metal components concentration in the catalyst, but in the case that the concentration of the metal components at the center (R=0) of the catalyst is Cc and the concentration of the metal components at the surface (R=1) is Cs, the ratio Cs/Cc of the concentrations of the metal components at these positions is usually within the range of 0 to 0.9, preferably 0.01 to 0.5.

The carrier used in the present invention is a refractory carrier, and in particular, a porous refractory inorganic oxide is preferred. For ecample, there can be mentioned an oxide of at least one selected from elements in Groups II, III and IV of the periodic table.

Of these oxides just mentioned, preferable ones include silica, alumina, magnesia, zirconia, thoria, boria, strontia and hafnia; more preferable ones include alumina, silica-alumina, silica-magnesia and alumina-magnesia; and the most preferable oxide is alumina. Preferably, the alumina has a crystalline structure of δ, ρ, χ or the like.

The diameter of this carrier is generally within the range of 0.1 to 10 mm, and in the case that the carrier is prepared by extrusion, it is usually in the range of 0.3 to 10 mm. When the shape of the carrier is spherical, it is preferably within the range of 0.1 to 5 mm.

Further, it is preferred that the surface area of the carrier is usually at least about 100 m²/g, and that average pore diameter and pore volume of the carrier is at least about 20 Å (angstrom) or more and 0.4 cc/g, respectively.

The metallic component to be supported in the carrier in the present invention is a metal having a hydrogenating activity. Examples of such metal components include metallic elements in Groups Vb, VIb and VIII of the periodic table. Examples of Group Vb include V, Nb and Ta; examples of Group VIb include Cr, Mo and W; and examples of VIII include Fe, Co, Ni, Pd and Pt. In particular, Ni, Co, Mo, V and W are preferred, and in the case of combinations, Ni-Mo, Co-Mo, Ni-V and Ni-Co-Mo are preferred.

These metals are effective even in any state of metals, oxides and sulfides.

The amount of the active metal to be supported in the carrier is usually within the range of about 0.1 to about 25% by weight, preferably about 0.5 to about 20% by weight, in terms of metallic element, based on the total weight of the catalyst.

In the case that two or more metallic components are supported in the carrier, the concentration of each metallic component is also within the above mentioned range. The concentration of the coexistent metallic components is within the range of 0.01 to 25% by weight, preferably 0.1 to 15% by weight.

Now, a method for preparing a catalyst of the present invention will be described. In one embodiment, a carrier is immersed into a solution A containing an active metallic component at a temperature of 10° to 90° C., preferably room temperature to 50° C. for a period of 1 minute to 1 week or so, preferably 30 minutes to 3 days. After a predetermined period, the carrier is taken out therefrom, and it is then immersed into a solution B at a temperature of 10° to 90° C., preferably at room temperature for a period of 30 seconds to 12 hours, preferably 1 minute to 3 hours.

Alternatively, the carrier is immersed into the solution B at a temperature of 10° to 90° C., preferably room temperature to 50° C. for 30 seconds to 12 hours, preferably 1 minute to 3 hours. After a predetermined period, the carrier is taken out therefrom, it is then immersed into the solution A containing the active metallic component at a temperature of 10° to 90° C., preferably ordinary temperature to 50° C. for a period of 1 minute to 1 week, preferably 30 minutes to 3 days. After a predetermined period, the carrier is taken out therefrom. Then the carrier allowed to stand or heated at a temperature of 100° to 120° C. for drying. The thus dried carrier is calcined preferably at a temperature of 500° to 600° C. for a period of 2 to 6 hours in order to obtain the usable catalyst. In the present invention, there may be employed a method disclosed in the specification of Japanese Patent Provisional Publication No. 252682/1985 of the same inventors as in the present application, i.e., the method of immersing the carrier into a hydrophilic solvent (such as acetone) in order to remove water therefrom.

As sources of active metals in the solution A which the present invention requires, any compounds are usable inso far as they are water soluble metallic compounds, especially hydrochloride, nitrates and ammonium salts of these metals are preferably used.

As a source of an anion (e.g., a fluoride ion or chloride ion) of Group VII of the periodic table, ammonium ion, nitrate ion, sulfate ion, hydroxyl ion, phosphate ion or borate ion which is present in the solutions A and B used in the present invention, and any compound is usable, insofar as it provides the above mentioned ion. Preferable examples of these ion sources include acids, ammonia water and ammonium salts. Further, preferable examples of organic acids used in the present invention include acetic acid, citric acid, tartaric acid, malic acid and the like.

The concentration of each kind of ion is within the range of 0.05 to 10 mol/l, preferably 0.1 to 5 mol/l.

As water which is an example of the solution B, there is preferably used water which has been purified by a distillation method, an ion exchange resin method or the like.

Figure 9:
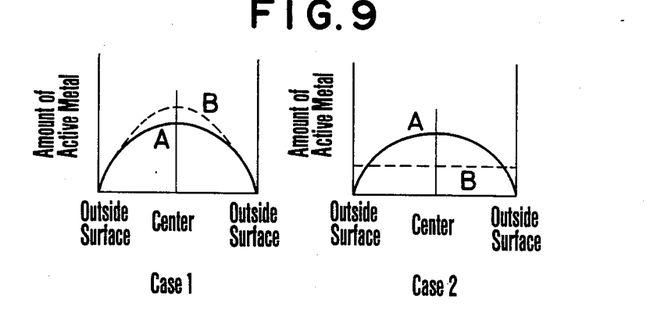
FIG. 9 is a schematic view showing a concentrative distribution of the supported metals in a carrier.

The distribution of the active metal concentration in the carrier can be confirmed from the measurement by EPMA, as described above, and examples of the concentrative distribution which can be controlled in the present invention are shown in FIG. 9. That is, in case 1 in this drawing, two kinds of active components A and B have high concentrations at the center of the carrier. The constitution of the case 1 can be prepared by immersing an alumina carrier into the solution A containing an active metal and an organic acid, and then immersing it into the solution B containing a mineral acid and ammonium fluoride.

In case 2 in FIG. 9, the concentration of the active component A alone is higher at the center of the carrier, and the active component B is substantially uniform therein. The constitution of the case 2 can be prepared by immersing the alumina carrier into the solution A and then immersing it into water which is the solution.

With regard to the catalyst according to the present invention, its specific surface area is within the range of 2 to 400 m$^2$/g, preferably 100 to 300 m$^2$/g; its bulk density is within the range of 0.3 to 1 g/ml, preferably 0.4 to 0.8 g/ml; its average pore volume is within the range of 0.1 to 4 ml/g, preferably 0.3 to 1.0 ml/g; and its average pore diameter is within the range of 50 to 500 Å, preferably 80 to 300 Å. Further, with regard to a pore distribution, the pore diameter is within the range of 0 to 1,000 Å, and it is most desirable that the pore volume of the pores the pore diameter of which is from 80 to 500 Å occupies about 25 to about 70% of the total pore volume of the pores each having the pore diameter 0 to 1,000 Å.

The shape of the catalyst is not limited, and for example, the catalyst may have a shape of a columnal form having a diameter of about 0.5 to 2 mm and a length of about 0.5 to 2 cm, a spherical form having a diameter of about 0.5 to 4 mm, a table form, a three-leaf form, or a four-leaf form.

Heavy oils referred to in this specification substantially contain distillation residue such as asphaltene, and examples of the heavy oils include crude oil, topped crude oil, residual oils from atmospheric distillation and vacuum distillation of the crude oil, deasphalting asphalt, liquefied oil of coal, and oils derived from shale oil, tar sand and gilsonite. These heavy oils contain 0.1 to 10 wt % of sulfur, 0.1 to 1 wt % of nitrogen, and 10 to 1,000 ppm (total amount of nickel and vanadium) of heavy metals such as nickel and vanadium.

With regard to conditions for hydrotreatment in the present invention, the temperature is within the range of 250° to 500° C., preferably 300° to 450° C.; pressure is within the range of 20 to 300 kg/cm$^2$, preferably 70 to 200 kg/cm$^2$; flow rate of a hydrogen gas is within the range of 250 to 2,500 Nm$^3$/kl, preferably 500 to 2,000 Nm$^3$/kl (feed oil); and LHSV is within the range of 0.1 to 5 hr$^{-1}$, preferably 0.5 to 3 hr$^{-1}$.

With regard to the catalyst of the present invention, even when it is used for a long period of time, the pores in the vicinity of the outside surface are not plugged, which fact allows oil molecules to diffuse the interior of the catalyst, with the result that the active sites in the catalyst can be utilized effectively. On the other hand, the same effect can be expected, even if the activity is low on the whole, but in this case, the activity of the catalyst is low, because the probability of allowing the invaded oil molecules to go out therefrom without reacting may be high. However, in the catalyst of the present invention, the concentration of the inside active metal is heightened, and thus almost all the oil molecules which have got into its interior can be converted in accordance with an internal diffusion. For these reasons, the activity of the catalyst does not deteriorate, i.e., its certain activity can be maintained.

Owing to the above mentioned effect, the life of the catalyst regarding the present invention can be prolonged more than conventional catalysts.

Now, the present invention will be described in detail in accordance with examples.

EXAMPLE 1

Into 750 ml of a 0.1 N hydrochloric acid solution containing 4.0 wt % of cobalt and 3.0 wt % of nickel from cobalt chloride and nickel chloride, respectively, were immersed 500 g of a porous alumina carrier at room temperature for 4 hours, and afterward the carrier was immersed into ion exchange water for 30 minutes, followed by sufficient drying and 2 hours' calcination at 550° C.

The thus prepared catalyst was further immersed into an ammonium molybdate solution (concentration of molybdenum=8.0 wt %) containing 3.0 wt % of ammonium fluoride for 1 hour, was then washed with ion exchange water, was dried, and was then calcined at 550° C. for 2 hours. In the thus finished catalyst, contents of molybdenum, cobalt and nickel were 6.5 wt %, 1.2 wt % and 0.9 wt %, respectively.

Figure 6:
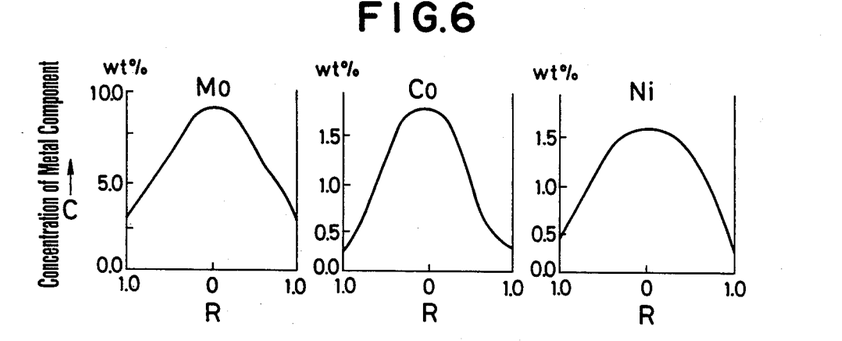
FIG. 6 shows distributions of supported metal components (Mo, Co and Ni) concentration in the catalyst of the present invention (Example 1)

The catalyst was cut, and the sectional surface thereof was subjected to a linear analysis by means of EPMA. The results are set forth in FIG. 6. That is, the respective component concentrations of Mo, Co and Ni are higher toward the center portion (R=0) of the catalyst and are lower in the vicinity of the outside surface portion (R=1) thereof. Cs/Cc ratios of Mo, Co and Ni were 0.32, 0.16 and 0.21, respectively. The pore volume of the catalyst grain was 0.65 ml/g; a average pore diameter was 130 Å; and a pore volume of the pores having a pore diameter of 80 to 500 Å was 72.5% of the total volume of the pores having a pore diameter of 0 to 1,000 Å.

COMPARATIVE EXAMPLE 1

Into 750 ml of an aqueous solution containing 4.0 wt % of cobalt and 3.0 wt % nickel from cobalt chloride and nickel chloride, respectively, were immersed 500 g of the same carrier as in Example 1 at room temperature for 4 hours, and afterward the carrier was washed with a small amount of ion exchange water, followed by drying and 2 hours' calcination at 550+ C. The thus prepared catalyst was further immersed into 750 ml of an aqueous solution containing 10.0 wt % of molybdenum from ammonium molybdate for 1 hour, was then washed with a small amount of ion exchange water, was dried, and was then calcined at 550° C. for 2 hours. In the thus finished catalyst, contents of molybdenum, cobalt and nickel were 10.0 wt %, 3.1 wt % and 2.2 wt %, respectively.

Figure 7:
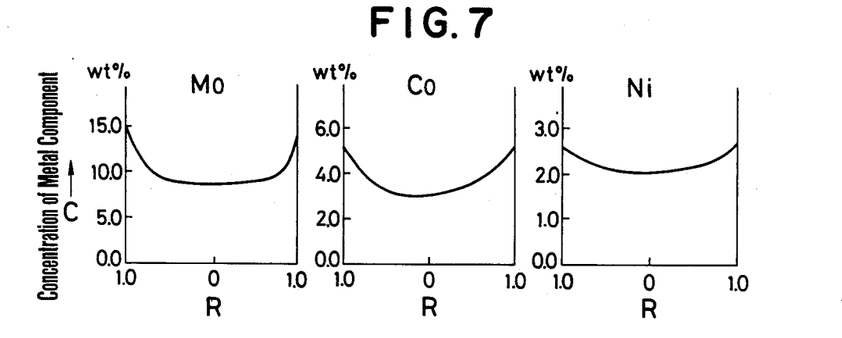
FIGS. 7 and 8 show concentrative distributions of supported metal components (Mo, Co and Ni) in the catalysts of Comparative Examples 1 and 2, respectively.

The catalyst grain was cut, and the sectional surface thereof was subjected to a linear analysis by means of EPMA. The results are set forth in FIG. 7. That is, the respective component concentrations of Mo, Co and Ni are lower toward the center portion (R=0) of the catalyst, in contrast to the catalyst of the present invention. Cs/Cc ratios of Mo, Co and Ni were 1.67, 1.67 and 1.3, respectively. The pore volume of the catalyst grain was 0.63 ml/g, average pore diameter was 132 Å, and poe volume of the pores having a pore diameter of 80 to 500 Å was 71.5% of the total volume of the pores having a pore diameter of 0 to 1,000 Å.

COMPARATIVE EXAMPLE 2

The same procedure as in Comparative Example 1 was repeated, but there was used a solution in which cobalt and nickel concentrations both were 1.5 wt % and the molybdenum concentration was 7.5 wt %. As a result, in the prepared catalyst, contents of molybdenum, cobalt and nickel were 6.8 wt %, 1.1 wt % and 1.0 wt %, respectively.

Figure 8:
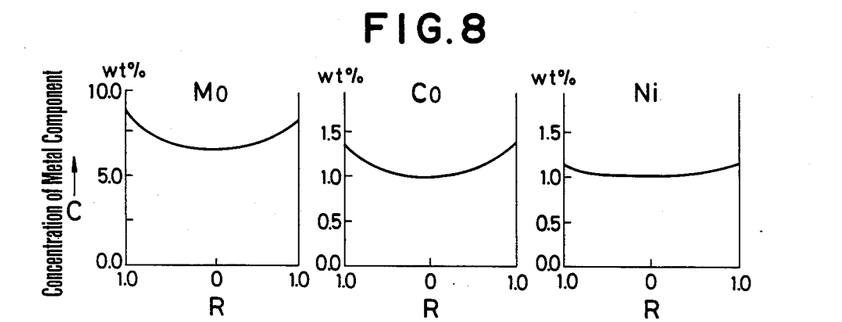

The catalyst was cut, and the sectional surface thereof was subjected to a linear analysis by means of EPMA. The results are set forth in FIG. 8. That is, the respective component concentrations of Mo, Co and Ni are uniform, as the center portion (R=0) of the catalyst grain is reached. Cs/Cc ratios of Mo, Co and Ni were 1.26, 1.51 and 1.13, respectively. The pore volume of the catalyst was 0.62 ml/g; average pore diameter was 131 Å; and pore volume of the pores having a pore diameter of 80 to 500 Å was 72.0% of the total volume of the pores having a pore diameter of 0 to 1,000 Å.

EXAMPLE 2

An aqueous solution containing 8 wt % of Mo and 2 wt % of Co was prepared by using ammonium molybdate and cobalt nitrate. Citric acid equimolar with Mo was dissolved in the above prepared aqueous solution to form a solution A1, and extruded alumina carrier grains each having a diameter of 1 mm were immersed into the solution A1 at room temperature for 3 hours. Afterward, the carrier was taken out therefrom and drained sufficiently, and it was then immersed into a solution B1 containing 1.0 mol/l of ammonium fluoride and 1.0 mol/l of HCl for 10 minutes. The thus treated carrier was taken out therefrom and drained, and was further immersed into acetone for 30 minutes. The acetone here used was that which had been circulated through a dehydrating agent. The carrier taken out therefrom was allowed to stand at room temperature for 30 minutes and was then calcined at 550° C. for 3 hours in order to prepare a catalyst, which was named catalyst 1.

EXAMPLE 3

As the solution A, the solution A1 of Example 2 was used, and as the solution B, water was employed. The same procedure as in Example 2 was repeated to prepare a catalyst, which was named catalyst 2.

EXAMPLE 4

An aqueous solution containing 8 wt % of Mo was prepared from ammonium molybdate, and the prepared solution was named a solution A2. Further, a 1.0 mol/l ammonium fluoride solution was named a solution B2.

The same procedure as in Example 2 was repeated with the exception that the solutions A1 and B1 were replaced with the solutions A2 and B2 just described, in order to prepare a catalyst, which was named catalyst 3.

EXAMPLES 5 TO 9

As active metal sources, there were employed ammonium metavanadate, ammonium paratungstate, ammonium molybdate, feric nitrate, nickel nitrate and cobalt nitrate, and the same procesure as in Example 2 was repeated from the combinations of Mo-Ni, Mo-Fe, Mo-Ni-Co, W-Ni and V-Ni in order to prepare catalysts, which were named catalysts 4 to 8.

In the respective cases, Mo, W and V were each contained at a concentration of 8 wt % and the others were each contained at a concentration of 2 wt % in the solutions.

COMPARATIVE EXAMPLE 3

An aqueous solution containing 5 wt % of Mo and 0.5 wt % of Co was prepared from ammonium molybdate and cobalt nitrate. The same alumina carrier as in Example 2 was immersed into the above prepared aqueous solution at room temperature for 3 hours, and it was then taken out therefrom and was drained. Afterward, the carrier was treated with acetone in the same manner as in Example 2, and the subsequent procedures were carried out as in Example 2, in order to prepare a catalyst, which was named catalyst 9.

Analytical Test

For the catalysts prepared in Examples 2 to 9 and Comparative Example 3, amounts of the supported metals were measured by atomic-absorption spectroscopy. The results are set forth in Table 1.

TABLE 1
(unit wt %)

| Catalyst | 1 | 2 | 3 | 4 | 5 | 6 | 7 | 8 | 9 |
|---|---|---|---|---|---|---|---|---|---|
| Mo | 4.5 | 5.5 | 4.5 | 4.6 | 5.0 | 4.5 | — | — | 4.6 |
| Co | 0.5 | 0.6 | — | — | — | 0.5 | — | — | 0.7 |
| Ni | — | — | — | 0.5 | — | 0.6 | 0.7 | 0.6 | — |
| Fe | — | — | — | — | 0.6 | — | — | — | — |
| W | — | — | — | — | — | — | 5.0 | — | — |
| V | — | — | — | — | — | — | — | 4.7 | — |

The catalyst 9 of Comparative Example 3 was prepared so as to conform its metal concentrations to those of the catalyst 1 of Example 2.

Further, the results of a linear analysis by EPMA for these catalysts are shown in FIGS. 10 to 13.

Figure 10:
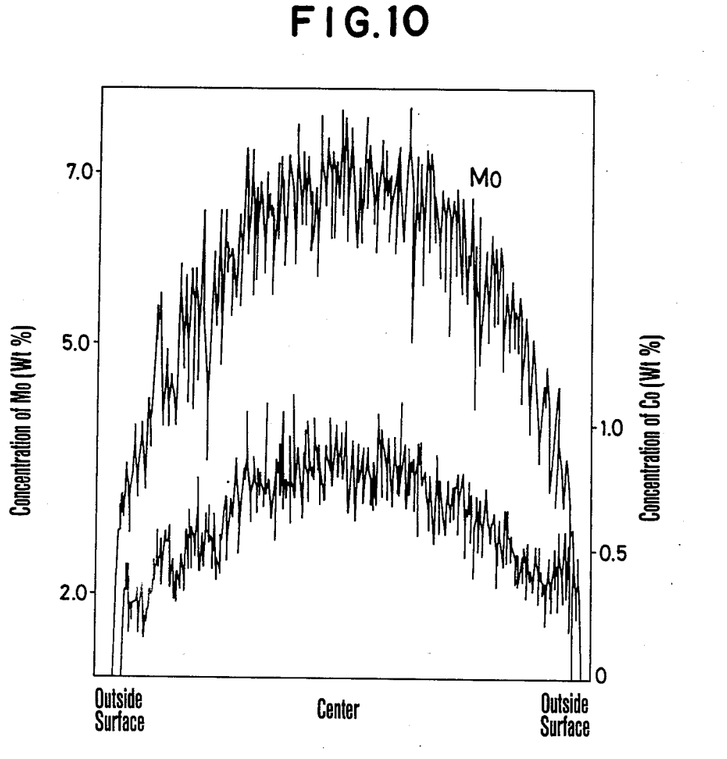
FIGS. 10 to 13 are analytical diagrams by EPMA regarding the catalysts obtained in the examples and the comparative example.
Figure 11:
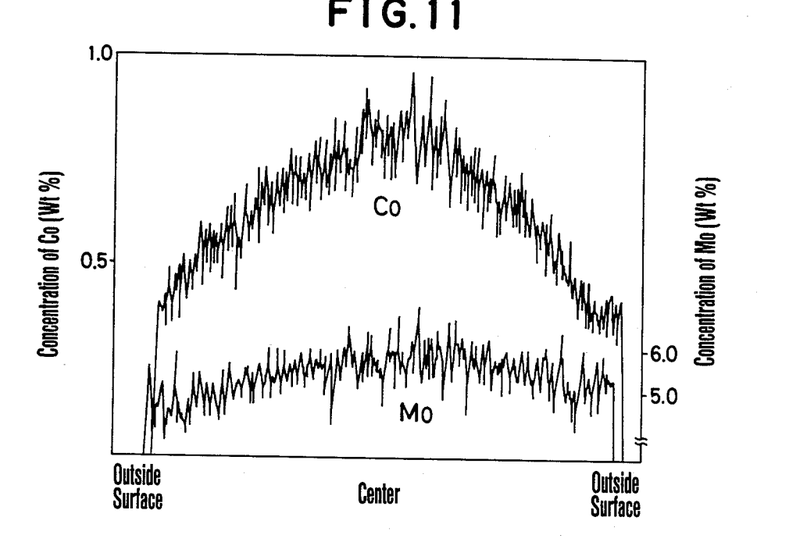
Figure 12:
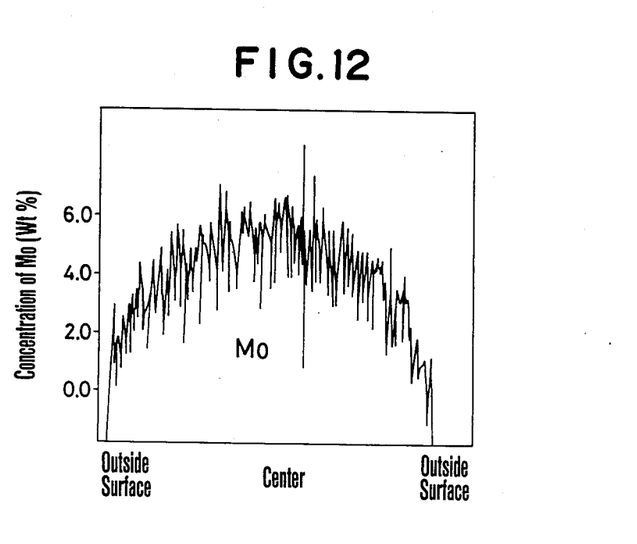

In the catalyst prepared in Example 2, the concentrations of Mo and Co are highest at the center of each catalyst, as shown in FIG. 10. With regard to the catalyst prepared in Example 3, the concentration of Co alone is higher at the center thereof as shown in FIG. 11, and the Mo concentration is distributed substantially constantly therein. Additionally, the catalyst prepared in Example 4 can have a higher Mo concentration at the center thereof as shown in FIG. 12, though Mo is only used. With regard to catalysts 4 to 8, every metal concentration is higher at the center of each catalyst, and they are indicative of about the same distribution as in FIG. 12.

As be apparent from the above, the method of the present invention permits controlling the distribution of the supported metals in the carrier.

Figure 13:
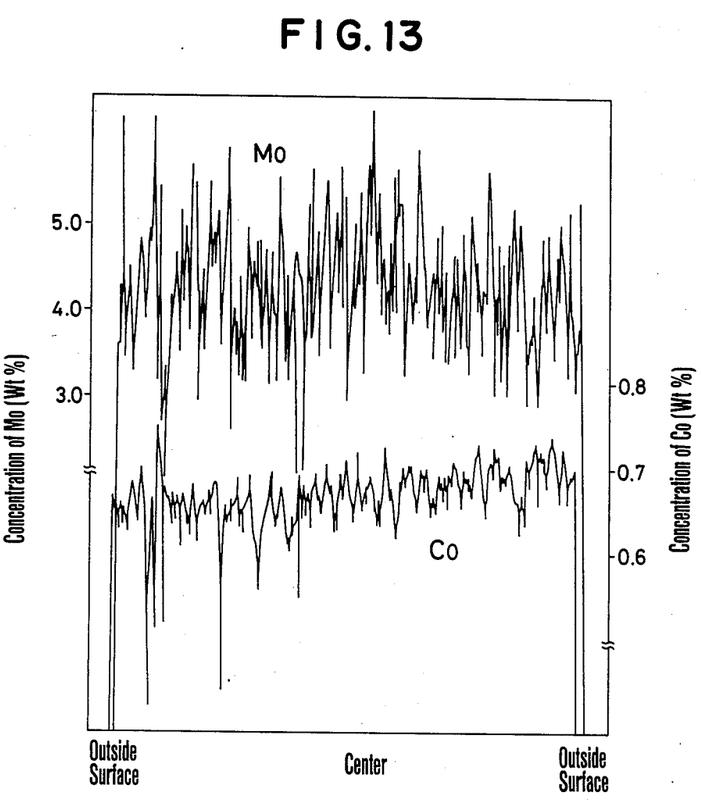

On the other hand, it can be found that with regard to the catalysts prepared in the comparative examples, the concentrations of the supported metals are constant therein as in FIG. 13.

EXAMPLE 10

A hydrotreatment of heavy oil was carried out by the use of a fixed-bed type reactor. That is, the reactor of 20 mm in inner diameter and 2,000 mm in length was filled with 300 g of a catalyst, and the hydrotreatment was accomplished under the following reaction conditions:

Partial pressure of hydrogen: 120 kg/cm$^2$
LHSV: 0.3 hr$^{-1}$
H$_2$/Material oil: 800 m$^3$/kl
Concentration of hydrogen: 90% or more
Reaction temperature: 410° C.

Feed was Arabian light vacuum residual oil. Properties of the oil were as follows:

Specific gravity (d15/4° C.): 1.02
Viscosity (100° C.): 1.130 cst
Sulfur content: 4.5 wt %
Nitrogen content: 0.2 wt %
Nickel+vadadium: 110 wt PPM
Asphaltene: 6.9 wt %

Figure 4:
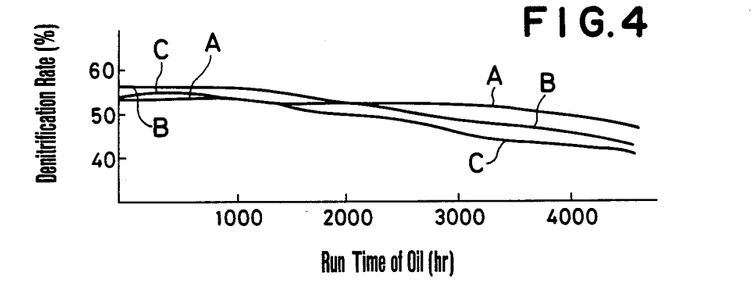
Figure 5:
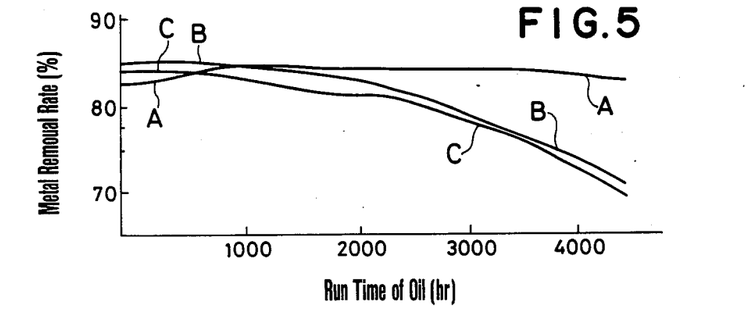

Evaluation was given by operating at a constant temperature and analyzing the resultant oil to investigate desulfurization rate, denitrification rate and metal removal rate. The results are set forth in FIGS. 3, 4 and 5. The catalysts in Example 1, Comparative Examples 1 and 2 were named A, B and C, respectively.

The catalyst A is of the present invention, the catalyst B has high concentrations of the active metals, and the catalyst C has the same concentrations of the active metals as in the catalyst A. However, the catalysts B and C are different from the catalyst A in distribution of the active metal concentration.

Figure 3:
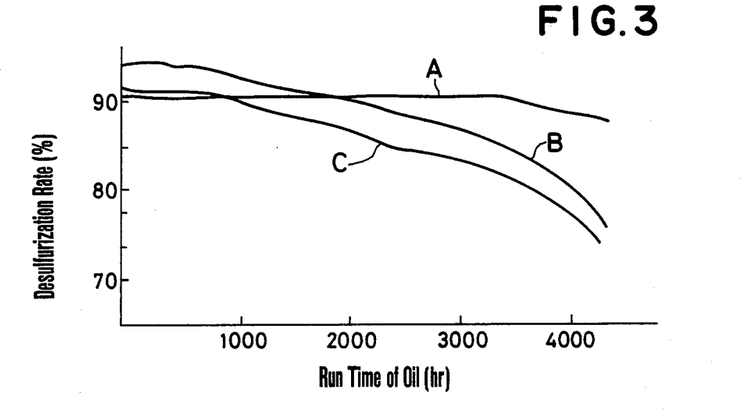
FIGS. 3, 4 and 5 are comparative views regarding performances of desulfurization, denitrification and metal removal in Example 1 and Comparative Examples 1 and 2, respectively, and in these drawings.

In FIG. 3, the desulfurization rate of the catalyst A is a little lower at an early stage but is stable for a long period of time. With regard to the denitrification rate in FIG. 4, values of the catalysts A, B and C all are close to one another, but it is apparent that the catalyst A of the present invention is still excellent toward the end of the run time of the oil. Further, with regard to the metal removal rate shown in FIG. 5, the three kinds of catalysts A, B and C are not so different in initial activity, but the metal removal rate of the catalysts B and C decreases gradually with time. On the contrary, in the catalyst A of the present invention, the metal removal rate scarcely diminishes and its constant effect is maintained.

EXAMPLE 11

A hydrotreatment of heavy oil was carried out with the catalysts 1 and 9 by the use of a fixed-bed type reactor.

Reaction conditions were as follows:

Partial pressure of hydrogen: 110 kg/cm$^2$
LHSV: 0.3 hr$^{-1}$
H$_2$/Material oil: 800 m$^3$/kl
Reaction temperature: 400° C.
Material oil: Arabian light vacuum residual oil Evaluation was given by analyzing the prepared oils at a constant temperature. The results are set forth in Table 2.

TABLE 2

| | Run of oil hr$^{-1}$ | Desulfurization rate* | Metal removal rate* |
|---|---|---|---|
| Catalyst 1 | 500 | 1.00 | 1.00 |
| (Example 2) | 2,000 | 0.98 | 1.02 |
| | 3,000 | 0.95 | 1.01 |
| Catalyst 9 | 500 | 1.01 | 1.02 |
| (Comparative | 2,000 | 0.94 | 0.92 |

TABLE 2-continued

| | Run of oil hr$^{-1}$ | Desulfurization rate* | Metal removal rate* |
|---|---|---|---|
| Example 3) | 3,000 | 0.89 | 0.85 |

*The respective values of the desulfurization rate and metal removal rate are relative values on the basis of the assumption that those of the catalyst 1 at 500 hours are regarded as 1.00.

It is apparent from Table 2 that the catalyst according to the present invention does not deteriorate more easily than the catalyst prepared by the usual technique, though the similar metal contents are supported.

What is claimed is:

1. A catalyst for hydrotreatment of heavy oils in which at least one active metal component for hydrogenation selected from the Groups Vb, VIb and VIII of the periodic table is supported in a porous refractory carrier, said catalyst being characterized in that the distribution of the metal concentration in each catalyst satisfies the relationships of $Cr_1 < Cr_2$ and $R_1 > R_2$ in the sectional surface of said catalyst, wherein $R_1$ and $R_2$ represent ratios of distances $r_1$ and $r_2$ from the center of said sectional surface of said catalyst to points therein, respectively, to a distance 1 from said center to the outside surface of said catalyst, and $Cr_1$ and $Cr_2$ represent the concentration of said metal component at said points.

2. A catalyst for hydrotreatment of heavy oils according to claim 1 wherein said metal component is at least one metal selected from the group consisting of nickel, cobalt, molybdenum, vanadium and tungsten.

3. A method for preparing a catalyst for hydrogenation of heavy oils by supporting an active metal in a porous refractory carrier, said method being characterized by comprising the steps of immersing said carrier into the following solution A, removing it therefrom, and further immersing it into the following solution B, removing it therefrom, drying and calcining it so as to control the distribution of said active metal concentration across the cross-section of said carrier in that the said distribution of said active metal concentration satisfies the relationships of $Cr_1 < Cr_2$ and $R_1 > R_2$ in the sectional surface of said catalyst, wherein $R_1$ and $R_2$ represent ratios of distances $r_1$ and $r_2$ from the center of said sectional surface of said catalyst to points therein, respectively, to a distance 1 from said center to the outside surface of said catalyst, and $Cr_1$ and $Cr_2$ represent the concentrations of said metal component at said points:

solution A: an aqueous solution containing at least one active metal selected from the Groups Vb, VIb and VIII of the periodic table; or an aqueous solution containing said active metal and at least one anion selected from the group consisting of anions of Group VIIa of the periodic table, an ammonium ion, nitrate ion, sulfate ion, hydroxyl ion, phosphate ion, borate ion and organic acids; and solution B: water or an aqueous solution containing at least one compound providing an anion selected from the group consisting of anions of the Group VIIa of the periodic table, an ammonium ion, nitrate ion, sulfate ion, hydroxyl ion, phosphate ion, borate ion and organic acids, said solution B being free of said active metal;

at least one of solutions A and B containing said anion.

4. A catalyst for hydrotreatment of heavy oils according to claim 2 wherein the amount of said metal is about 0.1 to 25 weight % of said catalyst.

5. A catalyst for hydrotreatment of heavy oils according to claim 4 containing at least two of said metals and containing at least one of nickel, cobalt or molybdenum.

6. A catalyst for hydrotreatment of heavy oils according to claim 1 wherein the ratio of metal concentration at the surface to the center is 0 to 0.9.

7. A catalyst for hydrotreatment of heavy oils according to claim 6 wherein said ratio is 0.01 to 0.5.

8. A catalyst for hydrotreatment of heavy oils according to claim 6 wherein said catalyst has a specific surface area of 2 to 400 m$^2$/g, an average pore diameter of 50 to 500 Angstroms, an average pore volume of 0.1–4 cc/g and a bulk density of 0.3 to 1 g/ml.

9. A catalyst for hydrotreatment of heavy oils according to claim 8 wherein said specific surface area is 100 to 300 m$^2$/g, said average pore diameter is 80 to 300 Angstroms, said average pore volume is 0.3 to 1 cc/g and said bulk density is 0.4 to 0.8 g/ml.

10. A catalyst for hydrotreatment of heavy oils according to claim 1 wherein about 25 to 70% of the pores having a pore diameter up to 1,000 Angstroms have a pore diameter within the range of 80 to 500 Angstroms.

11. A catalyst for hydrotreatment of heavy oils according to claim 1 wherein said porous refractory carrier is alumina.

12. A method for preparing a catalyst for hydrogenation of heavy oils according to claim 3 wherein the carrier removed from solution B is re-immersed into solution A prior to drying.

13. A method for preparing a catalyst for hydrogenation of heavy oils according to claim 3 wherein said active metal is at least one metal selected from the group consisting of nickel, cobalt, molybdenum, vanadium and tungsten.

14. A method for preparing a catalyst for hydrogenation of heavy oils according to claim 13 wherein at least two of said metals is present and at least one of nickel, cobalt, molybdenum is present in solution A.

15. A method for preparing a catalyst for hydrogenation of heavy oils according to claim 3 wherein said anion of Group VIIa is fluoride or chloride.

* * * * *

UNITED STATES PATENT AND TRADEMARK OFFICE
CERTIFICATE OF CORRECTION

PATENT NO. : 4,760,045
DATED     : July 26, 1988
INVENTOR(S) : Yasuyuki Oishi et al.

It is certified that error appears in the above-identified patent and that said Letters Patent is hereby corrected as shown below:

In the heading under [30] Foreign Application Priority Data, for "60-38351" read --61-38351--.

Column 2, line 1, for "and" read --are--; line 5, after "As" read --a--;

Column 3, line 22, for "$CR_1$ and $CR_2$" read --$Cr_1$ and $Cr_2$--; line 30, for "decomposition" read --deposition--.

Column 4, line 58, for "$\rho$" read --$\eta$--.

Column 5, line 58, for "inso far" read --insofar--.

Column 6, line 27, after "solution" read --B-- .

Column 7, line 47, delete "a"; line 48, delete "a"; line 60, for "+C" read --°C--.

Column 8, line 9, for "poe" read --pore--.

Column 9, line 7, for "from" read --for--.

Signed and Sealed this

Sixth Day of June, 1989

Attest:

DONALD J. QUIGG

Attesting Officer

Commissioner of Patents and Trademarks